United States Patent
Colgan et al.

(10) Patent No.: US 6,955,481 B2
(45) Date of Patent: Oct. 18, 2005

(54) METHOD AND APPARATUS FOR PROVIDING PARALLEL OPTOELECTRONIC COMMUNICATION WITH AN ELECTRONIC DEVICE

(75) Inventors: Evan G. Colgan, Chestnut Ridge, NY (US); Bruce K. Furman, Poughquag, NY (US); Daniel J. Stigliani, Jr., Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 188 days.

(21) Appl. No.: 10/667,234

(22) Filed: Sep. 17, 2003

(65) Prior Publication Data

US 2005/0058408 A1 Mar. 17, 2005

(51) Int. Cl.[7] .............................................. G02B 6/36
(52) U.S. Cl. ............................ 385/89; 385/14; 385/49; 385/88
(58) Field of Search .......................... 385/14, 49, 88–94

(56) References Cited

U.S. PATENT DOCUMENTS

| | | | |
|---|---|---|---|
| 5,768,449 A | 6/1998 | Fuse et al. ...................... 385/1 |
| 6,164,836 A | 12/2000 | Yamada et al. ................ 385/88 |
| 6,307,197 B1 | 10/2001 | Krug et al. ............. 250/227.24 |
| 6,324,323 B1 | 11/2001 | Benham et al. ................ 385/49 |
| 6,330,377 B1 | 12/2001 | Kosemura ...................... 385/14 |
| 6,343,171 B1 | 1/2002 | Yoshimura et al. ............ 385/50 |
| 6,389,050 B2 | 5/2002 | Stronczer .................. 372/38.02 |
| 6,389,202 B1 | 5/2002 | Delpiano et al. .............. 385/49 |
| 6,752,539 B2 * | 6/2004 | Colgan et al. ................. 385/92 |
| 6,874,950 B2 | 4/2005 | Colgan et al. ................ 385/31 |
| 2005/0025434 A1 | 2/2005 | Benner et al. ................ 385/88 |

* cited by examiner

*Primary Examiner*—Phan T. H. Palmer
(74) *Attorney, Agent, or Firm*—Floyd A. Gonzalez; Cantor Colburn LLP

(57) ABSTRACT

An optoelectronic assembly for an electronic system includes a support electronic chip set configured for at least one of providing multiplexing, demultiplexing, coding, decoding and optoelectronic transducer driving and receive functions. A first substrate having a first surface and an opposite second surface is in communication with the support electronic chip set via the first surface while a second substrate is in communication with the second surface of the first substrate. The second substrate is configured for mounting at least one of data processing, data switching and data storage chips. An optoelectronic transducer is in signal communication with the support electronic chip set and an optical fiber array is aligned at a first end with the optoelectronic transducer and with an optical signaling medium at a second end. An electrical signal from the support electronic chip set is communicated to the optoelectronic transducer via an electrical signaling medium, and the support electronic chip set and the optoelectronic transducer share a common thermal path for cooling.

20 Claims, 4 Drawing Sheets

METHOD AND APPARATUS FOR PROVIDING PARALLEL OPTOELECTRONIC COMMUNICATION WITH AN ELECTRONIC DEVICE

BACKGROUND OF THE INVENTION

The present disclosure relates generally to optoelectronic communication with an electronic device, and particularly to the attachment arrangement for providing parallel optoelectronic communication between an electronic chip on a first level package to another electronic chip on another first level package using a high density optical transceiver.

Typically, optoelectronic transceivers are mounted on a second level package, such as a printed circuit board, and are provided with their own heat sink and a means of being electrically interconnected with a printed circuit board, such as via a socket or a solder Ball Grid Array (BGA). The typical pitch of the electrical connections in a BGA is approximately 1.27 mm, although some products use finer pitches such as 1.0 or 0.8 mm. The size of an optoelectronic transceiver is largely determined by the area required by the heat sink and/or the area required for electrical connections between the optoelectronic transceiver and the second level package.

The trend in the computer industry regarding large servers is to utilize multiple processor groups, each group containing multiple processors on a first level package, such as a Multi-Chip Module (MCM), which must be interconnected with very high speed data buses to enable the totality of processors to act in unison, otherwise referred to as a symmetric multi-processing (SMP) configuration. The first level package provides dense electrical interconnection between the multiple processor chip(s), each of which my contain multiple processor cores, cache memory chip(s) and other chips, which may also be mounted on the MCM or other first level package. To connect between multiple MCMs, copper interconnect technology has been used as the interconnect medium, but is limited in its ability to scale to the bandwidth/distance requirements of next generation servers. These limitations are primarily associated with the signal loss and distortion in the electrical transport media, such as printed circuit boards and connectors for example, and bandwidth reduction due to the skin effect at high data transmission rates. To overcome some of these limitations, optical interconnection, which does not have the copper limitations and can operate at speeds sufficient to satisfy future generation server interconnection requirements, is becoming the interconnection technology of choice. Many of these same technical problems occur in data communication systems (for example, datacom and telephone switching networks) that may also benefit from optical interconnection technology. Accordingly, there is a need in the art to provide an improved apparatus and method for providing optoelectronic communication with electronic chips, and particularly with electronic chips on a first level package such as MCMs in large high speed servers or data communication systems.

SUMMARY OF THE INVENTION

In one embodiment, an optoelectronic assembly for an electronic system includes a support electronic chip set configured for at least one of providing multiplexing, demultiplexing, coding, decoding and optoelectronic transducer driving and receive functions. A first substrate having a first surface and an opposite second surface is in communication with the support electronic chip set via the first surface while a second substrate is in communication with the second surface of the first substrate. The second substrate is configured for mounting at least one of data processing, data switching and data storage chips. An optoelectronic transducer is in signal communication with the support electronic chip set and an optical fiber array is aligned at a first end with the optoelectronic transducer and with an optical signaling medium at a second end. An electrical signal from the support electronic chip set is communicated to the optoelectronic transducer via an electrical signaling medium, and the support electronic chip set and the optoelectronic transducer share a common thermal path for cooling.

BRIEF DESCRIPTION OF THE DRAWINGS

Referring to the exemplary drawings wherein like elements are numbered alike in the accompanying Figures.

DETAILED DESCRIPTION OF THE INVENTION

An embodiment of the present invention provides an optoelectronic assembly which can be mounted on a first level package, such as an MCM, using C4, or micro solder balls (less than or equal to 500 micrometer pitch), just as the chips are attached, for a computer system, data communication system, or other electronic system, having a data communication path between an electronic computer, signal processing chip or other electronic chip, and an optoelectronic transducer that bypasses a printed circuit board, or other second level package, thereby providing high speed communication from the electronic chip to other components in the computer system, switching system or other electronic system. Another embodiment provides a high density optical signal path by using multiple optoelectronic transducers, alternatively referred to as a high density optical transceiver (HDOT). While embodiments described herein depict the interconnection of a processor complex within a Multi-Chip Module (MCM) to other processor complexes having an exemplary optoelectronic signal path, it will be appreciated that the disclosed invention is also applicable to the interconnection of other electronic devices housed in MCMs or SCMs (Single Chip Module), or other types of first level packaging. For example, embodiments of the invention may be employed for interconnecting the core switches within a large-scale Internet switch, or router, with the network processors in the router's line cards. Similarly, other electronic systems requiring dense electrical interconnection of electronic chips mounted on MCMs or SCMs or other types of first level packaging at a high aggregate bandwidth over distances of 0.02 meters (m) or greater may benefit from embodiments of the invention.

Figure 1:
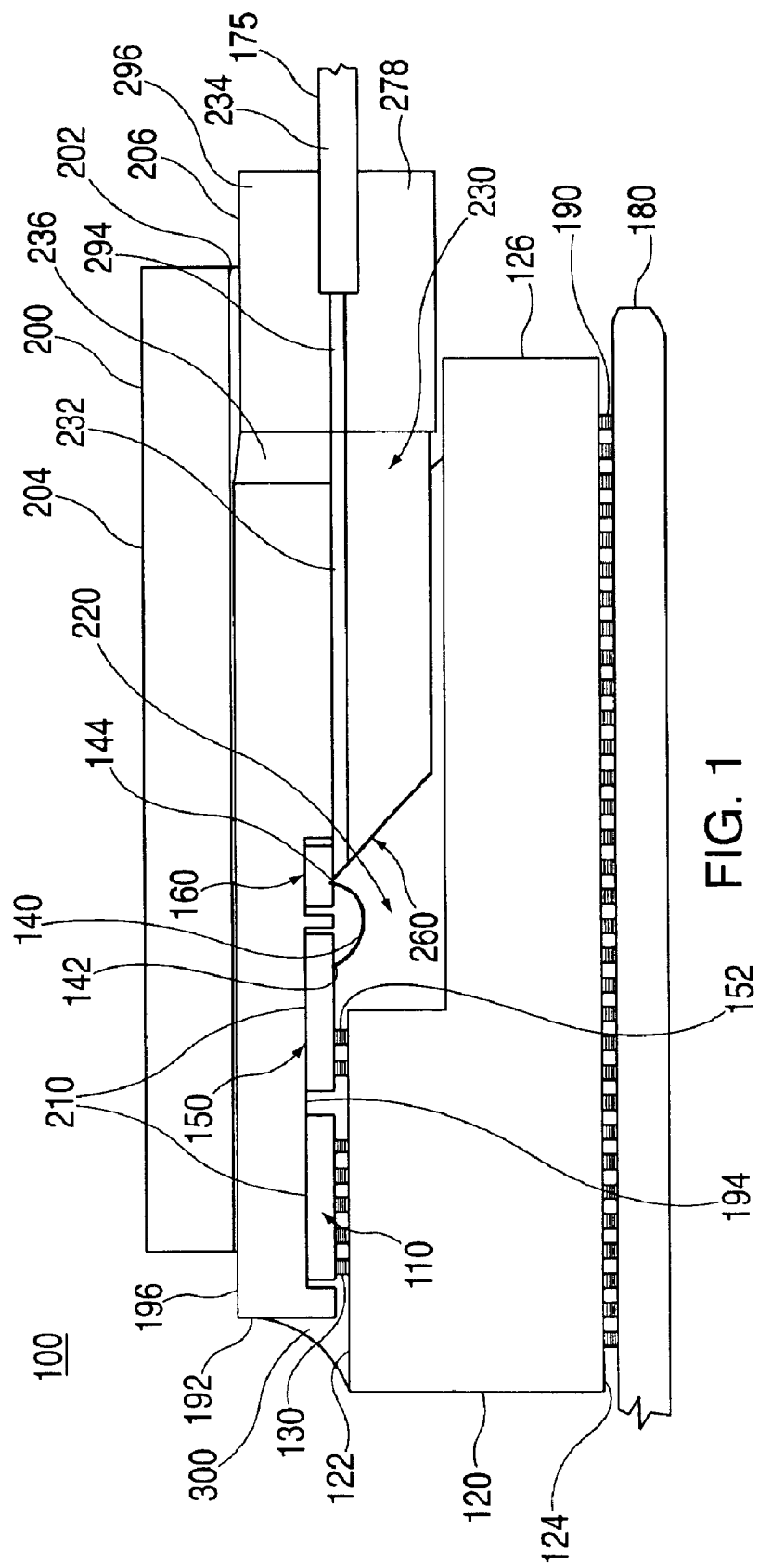
FIG. 1 depicts a partial cross section view of an exemplary High Density Optical Transceiver (HDOT) optoelectronic assembly in accordance with an embodiment of the invention.
Figure 2:
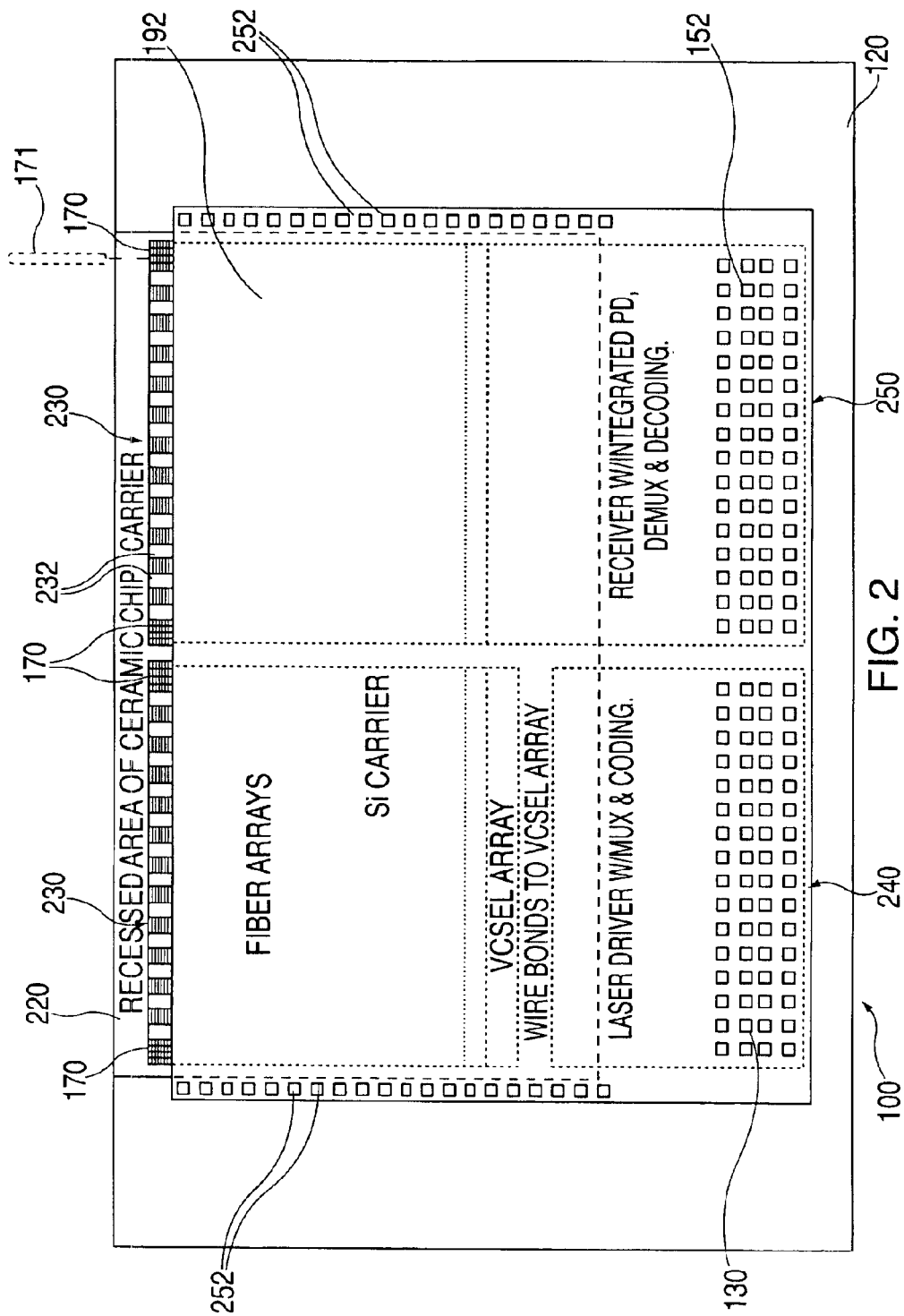
FIG. 2 depicts a top view of the exemplary optoelectronic assembly depicted in FIG. 1 illustrating a transmit section and a receiver section.

Referring now to FIG. 1, a partial cross section view of an optoelectronic assembly 100 for a computer system is depicted having an electronic chip or chips 110, 150 and 160, a substrate 120 having a first major surface 122 in communication with electronic chip 110 and 150 via a suitable electrical signal connection 130 (such as C4 micro solder ball interconnect technology for example), an electrical signal medium 140, such as a wirebond, or other means of forming electrical interconnection therewith, having a first end 142 in signal communication with a driver or receiver chip 150 via a suitable electrical connection, an optoelectronic (O/E) transducer chip 160 in communication with a second end 144 of electrical signal medium 140, a fiber array assembly 230 in communication with O/E chip 160 and optical coupling guides 170 (such as alignment pins for an MT ferrule, or other pluggable optical connector, for example, shown in FIG. 2) for fiber array assembly 230 with an optical signal medium 175, such as a fiber optic cable or bundle, for example. Also depicted in FIG. 1 is an MCM (alternatively referred to as a first level package) 180 in electrical communication with a second major surface 124 of substrate 120 via a suitable electrical connection 190 (such as C4's, for providing power and communicating signals to and from substrate 120 from and to other components of the computer system mounted on the first level package. Note that in an embodiment, the electrical signal medium 140 is dedicated to solely providing electrical signaling between chip 150 and optoelectronic transducer 160 and does not provide electrical interconnection between any additional devices, whereas the substrate 120 may provide electrical signal connections between multiple chips, and the MCM 180 may provide electrical signals between substrate 120 and multiple other devices. Disposed between first and second major surfaces 122, 124 of substrate 120 is an edge surface 126. As used herein, a major surface of substrate 120, such as first and second major surfaces 122, 124, is intended to refer to a surface of substrate 120 that is not an edge surface 126, and is not intended to be limiting in any other way. While reference is made herein to data communication from electronic chips 110 and 150 to optoelectronic transducer 160, it will be appreciated that the signal flow is bi-directional, where optoelectronic transducer 160 converts the outbound electrical data signals generated from electronic chips 110 and 150 into optical signals (e/o conversion), and inbound optical data signals into electrical signals (o/e conversion).

Further depicted in FIG. 1 is a Si carrier 192 having first and second surfaces 194, 196, where first surface 194 may be recessed into the Si carrier and is in thermal contact with chips 110 and 150 and optoelectronic transducer 160 while second surface 196 is in thermal contact with a Si support block 200 (alternatively referred to as a thermal hat, thermal spreader or heat spreader) having first and second surfaces 202, 204, where first surface 202 is in thermal contact, with Si carrier 192 to effect cooling thereof and provide mechanical support for Si carrier 192 operably coupled to a fiber array connector 206 containing fiber bundle 175. As used herein, the term thermal contact, or thermal communication, refers to an arrangement that provides good heat flow from one surface to another with a minimum change in temperature from one surface to another and does not necessarily denote the absence of an intermediate layer, such as a thermally conductive adhesive, paste, or a filler for example. An air cooled finned heat sink or water cooled modular refrigeration unit (not shown), or other means of removing heat, may be attached to the top surface 204 of the thermal hat 200 to further effect heat transfer, or top surface 204 may be coupled to a thermal hat, heat sink, or the like, which is also used to cool the processors and other chips mounted on the MCM 180. Thermal grease may be employed between the heat sink and thermal hat 200 to further effect heat transfer in the event of uneven contact surfaces. The thermal hat 200 provides the primary thermal path for heat flow from both the electronic chips 110 and 150 and the optoelectronic transducer(s) 160 to the heat sink or other means used to cool the system.

In an embodiment, optoelectronic transducer 160 includes a laser, such as a vertical cavity surface emitting laser (VCSEL), a light emitting diode, a photodiode (PD) array, or other light emitting or photosensitive device array, in communication with chip, or chips 150 for receiving an electrical signal therefrom and for generating an optical signal in response thereto or for receiving a light signal and for generating an electrical signal in response thereto. The output of optoelectronic transducer 160 is a light signal for outbound transmission that is aligned with and communicated to optical signaling medium 175 via fiber array assembly 230 for subsequent communication, and an electrical signal for inbound transmission upon receipt of a light signal from optical signaling medium 175, as discussed above and more fully herein.

Mounted on MCM 180 may be a processor chip, a memory chip, a signal processing chip, a switching chip, or any combination thereof or multiple combinations thereof. Electronic chip, or chips, 110 includes a multiplexer chip and/or a coder chip in electrical communication with chip, or chips, 150 via a suitable electrical connection 152 to substrate 120 for interconnection therebetween (such as C4 solder balls, or micro-ball-grid-array ($\mu$BGA) connections, for example). First level package 180 may be a multi-chip module (MCM), a dual-chip module (DCM), a single-chip module (SCM), or any other type of first level package substrate, or any combination thereof. MCM 180 may also be manufactured from a ceramic or an organic material.

As depicted in FIG. 1, an electrical signal path passes from MCM 180 through substrate 120 to chip 110, and through the substrate 120, to chip 150, and then to optoelectronic transducer 160, with the signal path bypassing the printed circuit board on which MCM 180 is mounted. Also, there is a common primary thermal path for the electronic chip(s) 110, 150 and the optoelectronic transducer(s) 160 where they share a thermal hat 200 onto which a heat sink or other heat removing device is attached.

In an exemplary embodiment and still referring to FIG. 1, the optoelectronic assembly is a high density optical transceiver (HDOT) 100 with high density C4 pads 190 such that the module 100 can reside on the same substrate as the processor chips of the MCM. This arrangement yields a high speed interconnect capability (scale with processor speeds since all interconnects are on the MCM 180 and there is no need for electrical signals to go to a PC board through a Land Grid Array (LGA) or other electrical connector. The electrical signals from, or to, the processors 300 (FIG. 6) are received, or sent, through ceramic or organic chip carrier substrate 120 and are carried to, or from, the Mux/Code, or Demux/Decode, chip 110 disposed on top of substrate 120 using standard via technology. It will be noted that substrate 120 may also include an organic or other suitable material and is not limited to a ceramic carrier. The Multiplexer/Coder, or Demux/Decode, chips 110 are C4 attached to substrate 120. A cutout 220 is configured in substrate 120 to allow room for a fiber array assembly shown generally as 230. Connection from the Mux/Code, or Demux/Decoder, chip 110 to the driver, or receiver chip, 150 is via lines in the carrier substrate 120 (not shown). And, finally connection to the VCSEL, or photodiode, array 160 is made with wirebonds 140. FIG. 1 illustrates fiber array connector 206 (right side of FIG. 1) which is preferably a make once connector bonded to Si carrier 192 and fiber array assembly 230 to simplify the assembly process therebetween by avoiding dangling optical fiber cables extending from bundle 175 and allow the use of standard fiber cables 294 with mechanically strippable buffer coatings 234. It will be appreciated that buffer coating 234 cannot withstand the C4 solder reflow temperatures. The alignment of fiber cables 232 of fiber array assembly 230 with fiber cables 294 of connector 206 is done using two guides 170 (which are coplanar to the fiber array as shown with respect to FIG. 2) and by placing a pin 171 (one shown in phantom) into a corresponding extra v-groove defining outbound grooves of each fiber array in fiber array assembly 230. The mating of the connector 206 is directed from viewing, through a microscope (not shown), from above assembly 100 and bonding in place with a suitable bonding agent generally indicated at 236.

Referring to FIG. 2, an exemplary embodiment of a HDOT 100 includes a transmit section 240 and a receiver section 250 which are packaged substantially the same except the transmit section 240 does the e/o conversion and the receiver section 250 does the o/e conversion. FIG. 2 also illustrates twelve parallel fibers 232 defined by two outboard guides 170 for each section 240, 250 totaling 24 fiber cables 232 and four guides 170 for HDOT 100. It will also be recognized that a plurality of C4s 252 are serially aligned on each peripheral side defining section 240 and 250 to provide mechanical strength for supporting the attachment of the Si carrier 192 to substrate 120. As an alternative, separate transmit and receive modules could be made if desired.

It will be recognized by one skilled in the pertinent art that the other embodiments are possible where back-emitting VCSEL arrays or photodiode arrays with transparent substrates are used in which case the Si carrier 192 may contain surface wiring which could be directly connected to substrate 120 with the support chips 110 and 150 electrically interconnected with Si carrier 192 by either wirebonding or flip chip bonding. Also, the support chip 150 may be connected to the back-emitting VCSEL array via the Si carrier surface wiring, thereby eliminating the need for wire connections 140. In this configuration one continuous well is used to contain chips 110, 150 and 160. FIG. 2 illustrates the photodiode array integrated with the receiver/amplifier, demux and decoder chip, however, it will be recognized that separate chips for each of these functions is possible.

Figure 3:
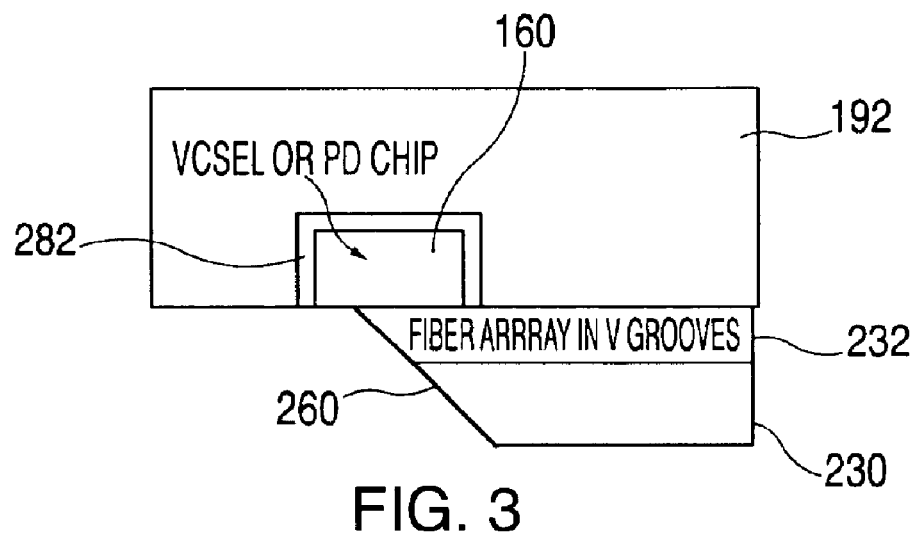
FIG. 3 depicts an enlarged partial view of FIG. 1 illustrating the coupling of light between a VCSEL or photodiode chip and an optical fiber.
Figure 4:
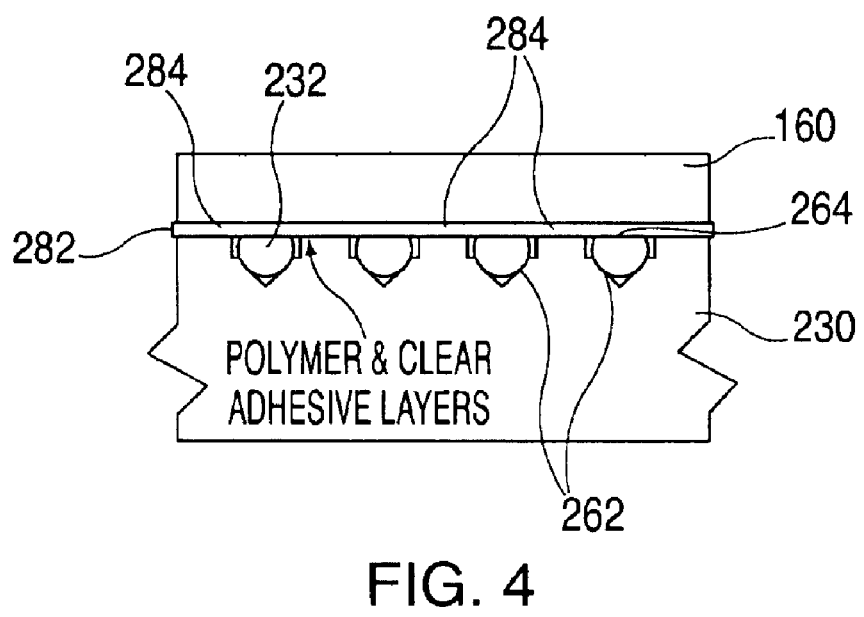
FIG. 4 depicts an orthogonal end-on view to that of FIG. 3 with multiple parallel optical fibers in communication with either a VCSEL or photodiode chip.

Referring now to FIGS. 3 and 4, coupling of light between the VCSEL or photodiode 160 and fiber 232 is illustrated. The coupling of light from fiber 232 to the VCSEL or photodiode 160 is done with a 45 degree metallized mirror 260 at the end of the fiber 232 as shown in FIG. 3. The light signal exits the VCSEL 160 vertically in a downward direction as illustrated and is directed into fiber 232 by the 45 degree mirror. In the case of a photodiode 160, the light signal from the fiber is directed vertically upward as illustrated into the photodiode 160. The method of fabrication of fiber array assembly 230 is described in a patent application entitled "Devices and Methods For Side-Coupling Optical Fibers To Optoelectronic Components" having Attorney Docket No.:YOR9-2002-0177US1 filed on Dec. 17, 2002. Recessing the VCSEL and photodiode into the Si carrier 192 enables alignment and bonding of the fiber array assembly 230 (e.g., 12 fibers) to the active O/E components by standard alignment tools and adhesives. Furthermore, in this manner, a need for a waveguide is alleviated. The fibers 232 within the fiber assembly 230 are aligned to each other by placing the fibers 232 in anisotropically etched silicon grooves 262 as shown in FIG. 4. This technique yields very high accuracy, on the order of a few micrometers and allows more contact area for bonding and adds mechanical stability contrasted with vertical attachment of fibers 232 to chip 160. The fiber optic cables 232 used are preferably multimode fibers with an initial core size of about 50 micrometers. This allows significant alignment tolerance which reduces assembly cost. As the optical link speed increases, the fiber core size is reduced to allow for a smaller photodiode 160 and may eventually become a single mode fiber. FIG. 4 shows that the fiber array assembly 230 has been lapped at 264 (e.g., top surface of fiber array) such that a portion the cladding has been removed. The removed cladding at 264 enables the core of the fiber 232 to be closer to the VCSEL or photodiode 160 and minimizes light spreading loss.

Figure 5:
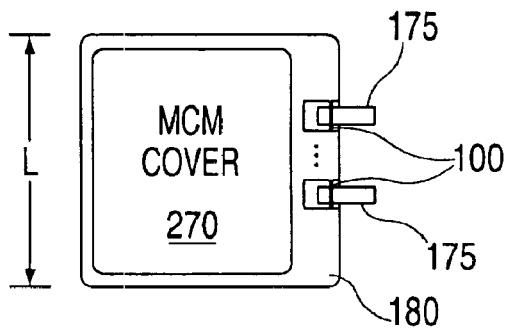
FIG. 5 depicts a top view of a pair of optoelectronic assemblies each having 24 optical fibers coupled to a multi-chip module (MCM)
Figure 6:
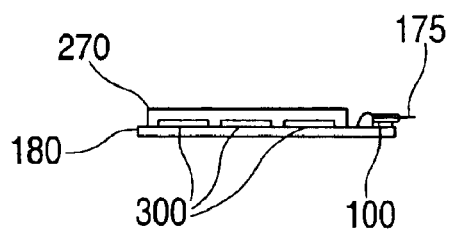
FIG. 6 depicts a side elevational view to that of FIG. 5.

Referring now to FIGS. 5 and 6, where FIG. 5 depicts a top view of an MCM with the HDOT 100 outside the MCM cover 270 but on the substrate 180. FIG. 6 depicts an orthogonal side view of FIG. 5, optoelectronic assembly 100 is now depicted having first and second HDOTs 100 in communication with MCM 180 via first and second C4s 190 (FIG. 1) or micro BGA solder balls. With multiple O/E devices, multiple electrical signals and multiple optical signals may be transmitted at the same time in parallel. Each HDOT 100 includes two 12 fiber arrays extending therefrom in operable communication with a MCM 180. The construction of the HDOT 100 allows the HDOT to be treated just like any other processor chip from a packaging viewpoint and will scale with the silicon and fiber optic technology. For example, the arrangement illustrated with respect to FIGS. 3 and 4 can yield as many as 200-250 fibers (e.g., 8-10 HDOTs each having two twelve fiber arrays) along a MCM having a length L of about 93 mm. This is equivalent to 1600-2000 electrical signals using an 8× multiplexer 110 when going from electrical to optical signaling. An MCM cover 270 is disposed over multiple processors 300 disposed on MCM 180 (three shown).

Fabrication & Assembly Process

Referring to the Figures, the fabrication and assembly method of HDOT 100 is an integral part of the overall design and is intended to provide a means to build the HDOT 100 inexpensively and reliably. Multiple Si carriers are fabricated on a wafer by using Si Reactive Ion Etch (RIE) techniques to fabricate the wells for the chip, 110, 150, VCSEL, and photodiode chips 160. This is a two step etching process to insure that the chips 110, 150, 160 are flush with the bottom surface of the Si carrier 192 in the case where the Si and GaAs chips have a different thickness. Any metallization, solder bumps, and alignment marks required on the carrier 192 are put on at this point. The active chips are bonded into the Si carrier 192 and any wirebonding between chips is done at this time (i.e., wirebond 140 between chips 150 and 160).

Figure 7:
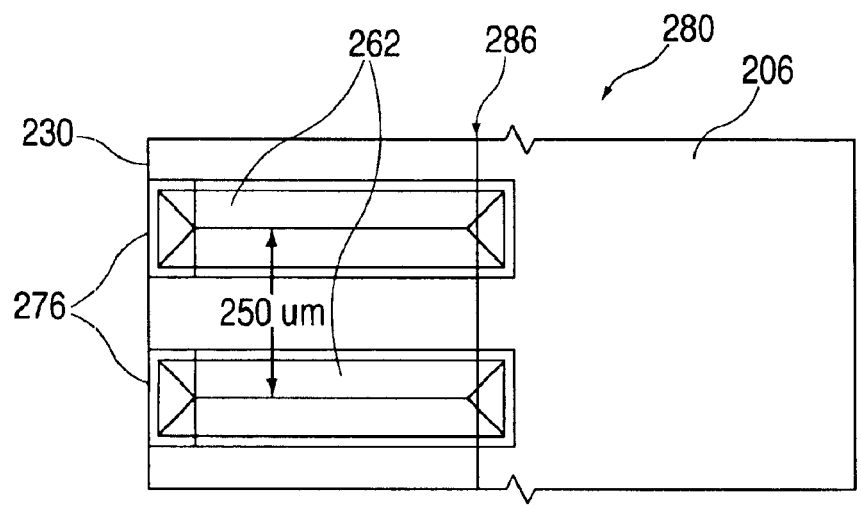
FIG. 7 depicts a top view of a fiber array and array connector Si base.
Figure 8:
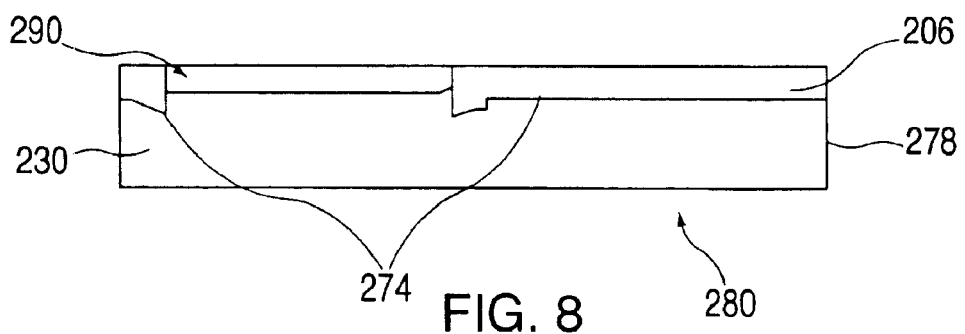
FIG. 8 depicts a side view to that of FIG. 7.

Referring to FIGS. 1–4 and with specific reference to FIGS. 7 and 8, the silicon fiber array assembly 230 and make once connector 206 are fabricated using similar processes. A high rate Si RIE is used to recess the v-grooves 262 and an anisotropic Si wet etch is used to form the grooves 262. A second RIE step is used to form a buffer layer cavity 274 and remove an angled facet 276 at the ends of the v-grooves (dark areas in FIGS. 7 and 8). FIGS. 7 and 8 illustrate the Si fiber array 230 and array connector silicon base 278 of connector 206 formed from a common Si Base 280. As discussed above, the method of fabrication of fiber array assembly 230 has been previously described in a patent application entitled "Devices and Methods For Side-Coupling Optical Fibers To Optoelectronic Components" having Attorney Docket No.:YOR9-2002-0177US1 filed on Dec. 17, 2002.

Still referring to FIGS. 1–4, 7, and 8, fabrication of fiber array assembly 230 includes bonding bare fibers 232, where the buffer layer has been removed, into Si grooves 262 with a polyimide adhesive 282 (See FIGS. 3 and 4). A top surface of each bare fiber 232 disposed in a respective groove 262 is lapped flat as shown in FIG. 4 where the Si surface 284 acts as a polish stop. Then Si base 280 and bare fibers 232 are cut generally shown at 286. Next a 45 degree facet is ground and polished on fiber array 230 generally indicated at 290 corresponding with mirror 260 in FIG. 1. A back facet is also ground and polished generally proximate cut 286 in FIG. 7 on fiber array 230. The 45 degree facet at 290 is then metallized to form mirror 260.

The fiber array connector 206 is assembled using Si base 278 with reference to FIGS. 1, 7, and 8. More specifically, fiber ribbon cable 175 having twelve parallel fibers is partially stripped generally indicated at 294 in FIG. 1 where stripped (i.e. buffer layer removed) fibers 294 are disposed in corresponding grooves of base 278. A "top hat" (inverted Si base) 296 is bonded to Si base 278 with fibers 294 disposed therebetween. Next, with reference to FIGS. 1, 7, and 8, a left side of Si bases 278 and 296 with stripped fibers 294 is cut and then polished. Lastly, alignment pins or guides 171 are inserted and bonded into grooves 170 on each side of the 12 fiber array 230 as best seen with reference to FIG. 2.

Referring again to FIG. 1, the overall HDOT 100 assembly sequence includes bonding two fiber arrays 230 to an assembled Si carrier 192 using a flip chip bonder having chips 110, 150, and 160 affixed thereto. The assembly sequence then includes C4 attachment of Si carrier 192 with connected fiber arrays 230 and chips 110, 150, and 160 to ceramic carrier substrate 120. A void area is filled with a suitable underfill material indicated generally by shaded area 300 under Si carrier 192 in FIG. 1.

The resulting partially assembled HDOT 100 is then attached to MCM 180 with C4s 190. A next step includes inserting, aligning, and bonding fiber array connector 206 to fiber array 230 with an UV adhesive, then a void area is filled with bonding material or agent generally indicated at shaded area 236 in FIG. 1. Lastly, Si support block 200 is added on top of the entire HDOT 100, including array connector 206, with preferably Ag filled epoxy for additional strength and to provide a heat path to a standard heat sink in thermal communication therewith. The void area 236 may also be filled at the same time as the Si support block 200 is attached.

During the operation of optoelectronic assembly 100, where a signal from electronic chip 110 is communicated to another component in the computer system, the electrical signal, initiated at electronic chip 110 and communicated to substrate 120, is directly communicated from substrate 120 to chip 300 via electrical interconnection with MCM 180, thereby bypassing the printed circuit board on which MCM 180 is mounted. A signal from chip 300 sent to optoelectronic assembly 100 is converted from an electrical signal to an optical signal, after which the optical signal is communicated to an optical signaling medium (such as a fiber optic ribbon cable 175, for example) for communication to another component in the computer system. During this operation, heat generated at electronic chip 110, 150, and optoelectronic transducer 160 is transferred across Si carrier 192 to thermal hat 200 and away from electronic chip O/E transducer 100. As herein disclosed and discussed, it will also be appreciated that embodiments of the invention are not limited to just one or two O/E or E/O chips, but may be applied to many O/E or E/O chips and that alternate arrangements of the chips are possible from the described above.

As discussed above, the high density optoelectronic transducer, alternatively referred to as an HDOT (High Density Optical Transceiver, herein represented by numeral 100, which may be a parallel transmitter, a parallel receiver, or a combination of parallel transmitter and receiver. The companion HDOT at the other end of the link on another first level package substrate (MCM for example) performs the o/e and e/o conversions for the other processor complex (represented by electronic chip 300). In an embodiment, electronic chips 110 and 150 are an electronic chip set 210 that includes signal multiplexing and coding functions, as well as functions for driving an e/o device directly and functions for receiving a signal directly from an o/e device and for signal demultiplexing and decoding functions.

Some embodiments of the invention include some of the following advantages: the HDOT allows attachment thereof directly to a MCM without going first through a PC board mounting; the close proximity of the optoelectronic components to the electronic chip (processor for example) enables high speed data transmission, with rates at 50–100 GHz or greater; use of high speed transmission medium (copper lines on ceramic, for example) and short transmission distances (50–75 millimeters for example) between processor and optoelectronic transducer; ability to reduce the size of the optoelectronic transceiver by having a common thermal path with the other chips mounted on the MCM to the thermal spreader and/or heat sink; reduced thermal resistance for the HDOT by using the available system cooling, thereby maintaining low temperatures for improved reliability. Some embodiments also provide a strain relief path for the fiber optic cable via a solid mounting surface, and preserve space on the printed circuit board and MCM. Mounting of the optical interface above the components and printed circuit board allows the optical cables to easily route to another MCM or to the edge of the printed circuit board for connection to another printed circuit board or MCM. Some embodiments enable common attachment processes, and standard MCM rework processes. The direct attachment of the optics to the chip carrier (MCM as an example of a first level package) enables a high bandwidth and low cost approach to optical interconnection of processor groups, and a parallel low profile arrangement of HDOTs provides for the high density packing and optimal space utilization.

Other advantages from using embodiments of the invention may be realized since the use of HDOT and fiber optics technology enables the high speed communication required between future processor complexes and allows improved packaging flexibility with its extended length capability. The bandwidth distance product capability of fiber optics allows future scaling of the bandwidth with the future processor speeds. The use of the high speed properties of HDOT and fiber optic technology, at 50–100 Giga-bits per second per line or greater, with direct first level package or MCM attachment enables the multiplexing of many parallel electrical signals into a single optical signal. This feature enables significant cost and complexity reduction by decreasing the number of signal lines between processor complexes, minimizes the need to de-skew the parallel signals, and provides inherent Electromagnetic Compatibility (EMC) because the signal is optical and is not susceptible to nor does it radiate electromagnetic energy. This approach simplifies the system packaging by reducing the number of complicated electrical connectors and simplifies the system printed circuit boards and back plane boards.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention is not to be limited to the particular embodiment disclosed as the best or only mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. An optoelectronic assembly for an electronic system comprising:
   a support electronic chip set configured for at least one of providing multiplexing, demultiplexing, coding, decoding and optoelectronic transducer driving and receive functions;
   a first substrate having a first surface and an opposite second surface, said first surface in communication with the support electronic chip set;
   a second substrate in communication with said second surface of said first substrate, said second substrate configured for mounting at least one of data processing, data switching and data storage chips;
   an optoelectronic transducer in signal communication with the support electronic chip set; and
   an optical fiber array aligned at a first end with said optoelectronic transducer and at a second end with an optical signaling medium;
   wherein an electrical signal from the support electronic chip set is communicated to the optoelectronic transducer via an electrical signaling medium, and
   wherein the support electronic chip set and the optoelectronic transducer share a common thermal path for cooling.

2. The assembly of claim 1, further comprising:
   a Si carrier having a first and second surface, the first surface configured to flushly mount the support electronic chip set and the optoelectronic transducer therewith, said Si carrier configured to provide unimpeded heat flow to said second surface opposite said first surface.

3. The assembly of claim 2, further comprising a second optoelectronic transducer flushly mounted with the first surface of the Si carrier, the first and second optoelectronic transducers being each configured to transmit and receive optical signals, respectively.

4. The assembly of claim 1, wherein the fiber array is bonded to the Si carrier in communication with the optoelectronic transducer, the optical signaling medium is bonded to the fiber array.

5. The assembly of claim 4, wherein the fiber array in communication with the optoelectronic transducer is via a mirror disposed at an angled surface at one end of the fiber array.

6. The assembly of claim 1, wherein the optical signaling medium includes an optical fiber cable bundle and a connector having at least one optical fiber incorporated therewith for communication with another optoelectronic assembly or the second substrate.

7. The assembly of claim 1, wherein:
   the second substrate comprises a multi-chip module, a dual-chip module, a single-chip module, or any combination thereof; and
   the first substrate is an organic or a ceramic substrate containing electrical interconnects.

8. The assembly of claim 1, wherein:
   the electrical signaling medium is a wirebond between the support electronic chip set and the optoelectronic transducer.

9. The assembly of claim 1, wherein the electrical connection between the first and second substrate uses micro solder balls with a pitch of less than or equal to 500 microns.

10. The assembly of claim 1, wherein:
    the first substrate includes a shelf or recess configured in the first surface to receive the optical fiber array therein in optical communication with the optoelectronic transducer.

11. An optoelectronic assembly for an electronic system comprising:
    a support electronic chip set configured for at least one of providing multiplexing, demultiplexing, coding, decoding and optoelectronic transducer driving and receive functions;
    a Si carrier having a first and second surface, the first surface configured to flushly mount the optoelectronic transducer;
    a first substrate having a first surface and an opposite second surface, said first surface in combination with the Si carrier providing electrical communication with and between the support electronic chip set and an optoelectronic transducer in signal communication with the support electronic chip set, and;
    a second substrate in communication with said second surface of said first substrate, said second substrate configured for directly mounting at least one of data processing, data switching and data storage chips; and
    an optical fiber array aligned at a first end with said optoelectronic transducer and at a second end with an optical signaling medium.

12. The assembly of claim 11, further comprising:
    a Si carrier having a first and second surface, the first surface configured to flushly mount the support electronic chip set and the optoelectronic transducer therewith, said Si carrier configured to provide unimpeded heat flow to said second surface opposite said first surface.

13. The assembly of claim 11, wherein:
    the second substrate comprises a multi-chip module, a dual-chip module, a single-chip module, or any combination thereof; and
    the first substrate is an organic or a ceramic substrate containing electrical interconnects, wherein the electrical connection between the first and second substrate uses micro solder balls with a pitch of less than or equal to 500 microns.

14. The assembly of claim 11, wherein:

the electrical signaling medium is a wirebond between the support electronic chip set and the optoelectronic transducer.

15. The assembly of claim 11, wherein:

the first substrate includes a shelf or recess configured in the first surface to receive the optical fiber array therein in optical communication with the optoelectronic transducer.

16. A method of fabricating an optoelectronic assembly for communicating a signal from a system electronic chip set on an MCM, the system electronic chip set adapted for at least one of data processing, data switching, and data storage, to another component in a computer system, the method comprising:

etching wells configured to flushly mount an optoelectronic transducer on a first surface of a Si carrier;

wiring the support electronic chip set and the optoelectronic transducer on the combination of the ceramic carrier and the Si carrier for electrical interconnection thereof;

where the support electronic chip set is configured for at least one of providing multiplexing, demultiplexing, coding, decoding and optoelectronic transducer driving and receive functions bonding the support electronic chip set and optoelectronic transducer to the Si carrier;

interconnecting electrically the support electronic chip set to the optoelectronic transducer;

bonding a fiber array aligned with the optoelectronic transducer;

attaching the Si carrier to a ceramic carrier;

attaching the ceramic carrier to a MCM; and aligning an optical signaling medium to the fiber array.

17. The method of claim 16, wherein the optical signaling medium includes a make once connector having a fiber cable bundle extending therefrom.

18. The method of claim 16, wherein said etching wells on said first surface of said a Si carrier are configured to flushly mount the chip set.

19. The method of claim 16, further comprising:

filling a void area between the Si carrier and the ceramic substrate with an underfill material.

20. The method of claim 16, further comprising:

adding a Si support block on a second surface opposite the first surface of the Si carrier.

* * * * *